(12) United States Patent
Han et al.

(10) Patent No.: US 11,100,725 B2
(45) Date of Patent: Aug. 24, 2021

(54) THREE-DIMENSIONAL (3D) MODELING METHOD OF CLOTHING

(71) Applicant: Z-EMOTION CO., LTD., Busan (KR)

(72) Inventors: Dong Soo Han, Busan (KR); Dong Wook Yi, Busan (KR)

(73) Assignee: Z-EMOTION CO., LTD., Busan (KR)

( * ) Notice: Subject to any disclaimer, the term of this patent is extended or adjusted under 35 U.S.C. 154(b) by 0 days.

(21) Appl. No.: 17/050,057

(22) PCT Filed: Nov. 28, 2019

(86) PCT No.: PCT/KR2019/016644
§ 371 (c)(1),
(2) Date: Oct. 23, 2020

(65) Prior Publication Data

US 2021/0166493 A1 Jun. 3, 2021

(51) Int. Cl.
*G06T 19/20* (2011.01)
*G06T 17/00* (2006.01)

(52) U.S. Cl.
CPC .............. *G06T 19/20* (2013.01); *G06T 17/00* (2013.01); *G06T 2210/16* (2013.01); *G06T 2219/2004* (2013.01); *G06T 2219/2016* (2013.01); *G06T 2219/2021* (2013.01)

(58) Field of Classification Search
CPC ......... G06T 15/00; G06T 15/04; G06T 15/10; G06T 17/00; G06T 19/00; G06T 19/20; G06T 2210/16; G06T 2219/2004; G06T 2219/2016; G06T 2219/2021
USPC ....................................................... 345/420
See application file for complete search history.

(56) References Cited

U.S. PATENT DOCUMENTS

| 10,008,039 | B1* | 6/2018 | Neustein | ................ | G06T 11/60 |
| 2002/0188372 | A1* | 12/2002 | Lane | ................ | G06T 19/00 |
| | | | | | 700/130 |
| 2011/0310086 | A1* | 12/2011 | Massen | ................ | G06T 17/00 |
| | | | | | 345/419 |

(Continued)

FOREIGN PATENT DOCUMENTS

| KR | 101767144 B1 | 8/2017 |
| KR | 101974573 B1 | 5/2019 |
| KR | 20190107611 A | 9/2019 |

OTHER PUBLICATIONS

International Search Report (PCT/ISA/210) and Written Opinion (PCT/ISA/237) dated Aug. 20, 2020, by the Korean Patent Office as the International Searching Authority for International Application No. PCT/KR2019/016644.

*Primary Examiner* — Sae Won Yoon
(74) *Attorney, Agent, or Firm* — Buchanan Ingersoll & Rooney PC

(57) ABSTRACT

A three-dimensional (3D) modeling method of clothing to adjust a size of a body on which the clothing is put and to model an appearance when the clothing is put on the body includes receiving a first body size which is a body size for modeling of the clothing; calculating a second body size whose size is reduced from the first body size according to a predetermined body reduction condition; displaying a 3D shape of a reduction body that is the second body size; overlapping and displaying a 3D shape of the clothing on the 3D shape of the reduction body; and displaying a change process of the 3D shape of the clothing overlapped on the reduction body while increasing a body size of the reduction body to the first body size input by the user.

4 Claims, 11 Drawing Sheets

(56) References Cited

U.S. PATENT DOCUMENTS

| | | | |
|---|---|---|---|
| 2016/0275724 A1 | 9/2016 | Adeyoola et al. | |
| 2018/0087196 A1* | 3/2018 | Jeon | A41H 3/007 |
| 2019/0130649 A1 | 5/2019 | O'brien et al. | |
| 2019/0384874 A1* | 12/2019 | Riley | G06F 3/011 |
| 2021/0065447 A1* | 3/2021 | Lee | G06T 19/00 |

* cited by examiner

THREE-DIMENSIONAL (3D) MODELING METHOD OF CLOTHING

TECHNICAL FIELD

The present disclosure relates to a three-dimensional (3D) modeling method of clothing to adjust a size of a body on which clothing is put and to model an appearance when the clothing is put on the body and a process of putting the clothing on the body.

BACKGROUND ART

As the standard of living gradually increases, selection of clothing is an important part as a way to express one's individuality in addition to solving basic food, clothing and shelter. People wear or own clothing that suits them or in their preferred colors and designs such that they enhance their external image as well as their self-satisfaction.

Clothing-related business that designs, manufactures, and sells clothing is expanding widely through Internet shopping malls which are active with the recent development of the Internet, in addition to the existing offline. In particular, as young people who are interested in clothing have become more prominent in their social advancement, such clothing-related business is a business field that is expected to develop continuously in the future.

Upon briefly reviewing clothing production process currently being conducted offline, first, designers create patterns by designing clothing they intend to release in the future. Then, designers sew these patterns to produce samples. When samples are produced, designers evaluate the design through an in-house meeting (exhibition), and request the production of samples of designs that are consumers' reaction, that is, expected to be highly commercial from clothing makers.

According to the related art, design work for clothing to be produced in the future, pattern production according to the design, and sewing work of connecting the produced patterns to each other are all performed manually. When design work, pattern production, and sewing work are performed manually, the manufacturing cost of the product increases because a large number of manpower must spend a lot of time working.

In addition, in the case of partially modify a high quality clothing design, because the above-described process must be repeated countless times by modifying the pattern, there is a problem that the working time for product development increases. Although methods of producing patterns on a computer by computerizing this process are partially used, to accurately evaluate the finished clothing, there is still the inconvenience of manually completing the prototype.

DESCRIPTION OF EMBODIMENTS

Technical Problem

Provided is to visually examine whether clothing being produced may match the body of various sizes in the production stage of clothing.

In addition, provided is to more naturally model a situation when clothing is put on the human body.

In particular, provided is to enable modeling of clothing made of an elastic material, and to propose a more natural modeling result of clothing made of the elastic material.

Technical Solution to Problem

According to an aspect of the present disclosure, a three-dimensional (3D) modeling method of clothing to adjust a size of a body on which the clothing is put and to model an appearance when the clothing is put on the body includes receiving a first body size which is a body size for modeling of the clothing; calculating a second body size whose size is reduced from the first body size according to a predetermined body reduction condition; displaying a 3D shape of a reduction body that is the second body size; overlapping and displaying a 3D shape of the clothing on the 3D shape of the reduction body; and displaying a change process of the 3D shape of the clothing overlapped on the reduction body while increasing a body size of the reduction body to the first body size input by the user.

The overlapping and the displaying of the 3D shape of the clothing may include determining the 3D shape of the clothing such that an outer surface of the 3D shape of the reduction body and an inner surface of the 3D shape of the clothing have a predetermined relationship.

The displaying of the change process of the 3D shape of the clothing may include determining a changed 3D shape of the clothing such that an outer surface of the 3D shape of the body with an increased size and the inner surface of the 3D shape of the clothing maintain the predetermined relationship. The predetermined relationship may mean a relationship in which a distance between a first point which is an arbitrary point on the outer surface and a second point which is an arbitrary point on the inner surface is equal to or greater than a predetermined minimum distance.

The 3D shape of the clothing may be defined by properties of one or more parts constituting the clothing, material information of the one or more parts, and stitch information between the one or more parts, the properties of the one or more parts may include shapes of the one or more parts, the material information of the one or more parts may include elasticity of the one or more parts, the stitch information may include at least one of a combining method, combining elasticity, and combining strength between the one or more parts, and the displaying of the change process of the 3D shape of the clothing may include increasing and displaying a size of the 3D shape of the clothing overlapped on the body according to an increase in the body size; and identifying a defect on the 3D shape the increased clothing by considering the properties of the one or more parts constituting the clothing, the material information of the one or more parts, and the stitch information between the one or more parts.

The identifying of the defect may include displaying defect information when the defect is identified on the 3D shape of the clothing according to the increase in the body size.

The displaying of the defect information may include displaying a defect indication mark on a position corresponding to a portion where the defect occurs; and displaying a body size on which the defect occurs.

A volume corresponding to the clothing in the absence of an external force may be smaller than a volume corresponding to a body of the first body size.

The predetermined body reduction condition may be a condition to reduce the body size such that the volume corresponding to the clothing in the absence of the external force is larger than a volume corresponding to the reduction body.

The displaying of the change process of the 3D shape of the clothing may further include displaying a stress map indicating a stress degree of the 3D shape of the clothing with an increased size according to the increase in the body size. The stress map may be overlapped and displayed on the 3D shape of the clothing.

The body may be defined by one or more parts constituting a human body model and one or more joints connecting the one or more parts, and the displaying of the stress map may include displaying a changed stress of the clothing overlapped on the 3D shape of the body that changes according to driving of any one joint of the one or more joints.

Advantageous Effects of Disclosure

According to the present disclosure, it is possible to visually examine whether clothing being produced may match the body of various sizes in the production stage of clothing.

In addition, the present disclosure may more naturally model a situation when clothing is put on the human body.

In particular, the present disclosure may enable modeling of clothing made of an elastic material and provide a more natural modeling result of clothing made of the elastic material.

In addition, the present disclosure may enable effective modeling of clothing even when the volume corresponding to the clothing in the absence of external force is smaller than the volume of a body having a body size input by a user.

In addition, the present disclosure may enable to easily modify clothing in each step of clothing modeling.

BEST MODE

Figure 1:
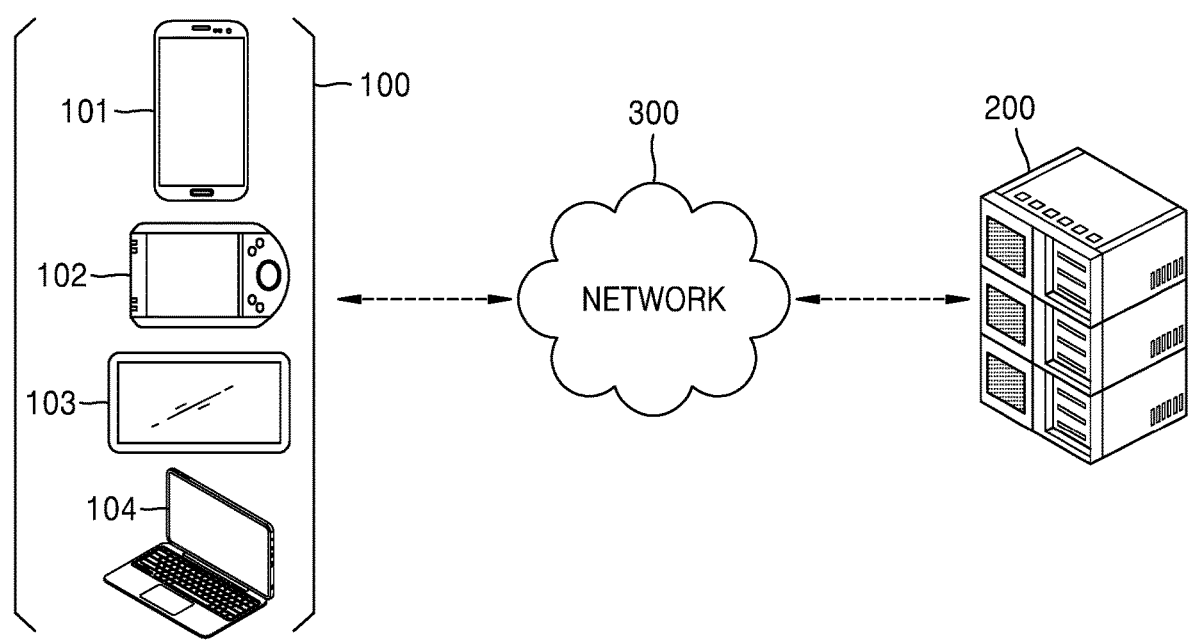
FIG. 1 is a diagram illustrating an example of a network environment according to an embodiment of the present disclosure.

According to an aspect of the present disclosure, a three-dimensional (3D) modeling method of clothing to adjust a size of a body on which the clothing is put and to model an appearance when the clothing is put on the body includes receiving a first body size which is a body size for modeling of the clothing; calculating a second body size whose size is reduced from the first body size according to a predetermined body reduction condition; displaying a 3D shape of a reduction body that is the second body size; overlapping and displaying a 3D shape of the clothing on the 3D shape of the reduction body; and displaying a change process of the 3D shape of the clothing overlapped on the reduction body while increasing a body size of the reduction body to the first body size input by the user.

MODE OF DISCLOSURE

The detailed description of the present disclosure to be described later refers to the accompanying drawings, which illustrate a specific embodiment in which the present disclosure may be practiced. These embodiments are described in detail sufficient to enable those skilled in the art to practice the present disclosure. It is to be understood that various embodiments of the present disclosure are different from each other but need not be mutually exclusive. For example, specific shapes, structures, and characteristics described herein may change from one embodiment to another and implemented without departing from the spirit and scope of the present disclosure. In addition, it should be understood that the positions or arrangements of individual elements in each embodiment may change without departing from the spirit and scope of the present disclosure. Therefore, the detailed description to be described below is not made in a limiting sense, and the scope of the present disclosure should be taken as encompassing the claimed scope of the claims and all scopes equivalent thereto. Like reference numerals in the drawings denote the same or similar elements over several aspects.

Hereinafter, various embodiments of the present disclosure will be described in detail with reference to the accompanying drawings in order to enable those skilled in the art to easily implement the present disclosure.

FIG. 1 is a diagram illustrating an example of a network environment according to an embodiment of the present disclosure.

The network environment of FIG. 1 shows the example including a plurality of user terminals 101, 102, 103 and 104, a server 200 and a network 300. FIG. 1 is an example for describing the disclosure, and the number of user terminals or the number of servers is not limited as shown in FIG. 1.

The plurality of user terminals 101, 102, 103 and 104 may be fixed terminals implemented as computer devices or mobile terminals. Examples of the plurality of user terminals 101, 102, 103, and 104 include smart phones, mobile phones, navigation, computers, notebook computers, digital broadcasting terminals, personal digital assistants (PDAs), portable multimedia players (PMPs), tablet PCs, etc.

The plurality of user terminals 101, 102, 103, and 104 may communicate with each other and/or with the server 200 over the network 300 by using a wireless or wired communication method.

Meanwhile, the communication method of the plurality of user terminals 101, 102, 103, and 104 is not limited and may also include a communication method that utilizes a communication network (for example, a mobile communication network, wired Internet, wireless Internet, and a broadcasting network) that may include the network 300 as well as short range wireless communication between devices.

For example, the network 300 may include any one or more of networks among a personal area network (PAN), a local area network (LAN), a campus area network (CAN), a metropolitan area network (MAN), a wide area network (WAN), a broadband network (BBN), and the Internet.

In addition, the network 300 may include any one or more of network topologies, including bus networks, star networks, ring networks, mesh networks, star-bus networks, tree or hierarchical networks but is not limited thereto.

Hereinafter, for convenience of description, the plurality of user terminals 101, 102, 103, and 104 are referred to as and described a user terminal 100.

The server 200 may be implemented as a computer device or a plurality of computer devices that provide commands, codes, files, contents, services, etc. to the user terminal 100 through the network 300.

For example, the server 200 may provide a file for installing an application to the user terminal 100 accessed through the network 300. The user terminal 100 may install the application using a file provided from the server 200. In this case, the application may be an application for performing a three-dimensional (3D) modeling method of clothing.

In addition, the user terminal 100 may access the server 200 under the control of an operating system (OS) and at least one program (for example, a browser or an installed application) to receive services or contents provided by the server 200. For example, when the user terminal 100 requests pattern data through the network 300, the server 200 may transmit at least one pre-generated pattern data to the user terminal 100 in response to such a request. The user terminal 100 may display and provide the pattern data to a user according to the control of the application.

Figure 2:
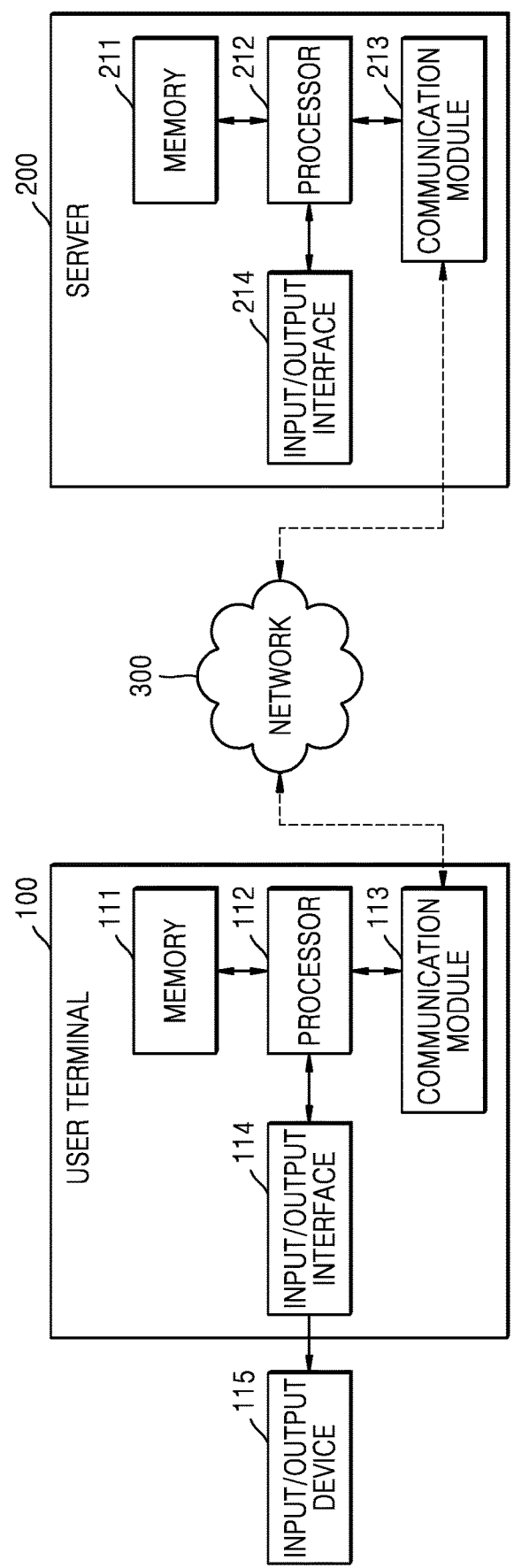
FIG. 2 is a block diagram for describing the internal configurations of a user terminal and a server according to an embodiment of the present disclosure.

FIG. 2 is a block diagram for describing the internal configurations of the user terminal 100 and the server 200 according to an embodiment of the present disclosure.

The user terminal 100 and the server 200 may respectively include memories 111 and 211, processors 112 and 212, communication modules 113 and 213, and input/output interfaces 114 and 214.

The memories 111 and 211 are computer-readable recording media, and may include permanent mass storage devices such as random access memory (RAM), read only memory (ROM), and a disk drive. In addition, the memory 111 and 211 may store an OS and at least one program code (for example, a code for 3D modeling of clothing installed and driven in the user terminal 100). These software components may be loaded from a computer-readable recording medium separate from the memories 111 and 211 using a drive mechanism. Such a separate computer-readable recording medium may include a computer-readable recording medium such as a floppy drive, a disk, a tape, a DVD/CD-ROM drive, a memory card, etc.

In another embodiment, the software components may be loaded into the memories 111 and 211 through the communication modules 113 and 213 rather than the computer-readable recording medium. For example, at least one program may be loaded into the memories 111 and 211 based on a program installed by files that are provided by developers or a file distribution system (for example, the server 200 described above) that distributes the installation file of the application through the network 300.

The processors 112 and 212 may be configured to process commands of a computer program by performing basic arithmetic, logic, and input/output operations. The commands may be provided to the processors 112 and 212 by the memories 111 and 211 or the communication modules 113 and 213. For example, the processors 112 and 212 may be configured to execute commands received according to a program code stored in a recording device such as the memories 111 and 211.

The communication modules 113 and 213 may provide functions for the user terminal 100 and the server 200 to communicate with each other through the network 300, and may provide functions to communicate with another user terminal (not shown) or another server (not shown). As an example, a request generated according to the program code that the processor 112 of the user terminal 100 stores in a recording device such as the memory 111 may be sent to the server 200 through the network 300 under the control of the communication module 113. To the contrary, control signals, commands, contents, files, etc. provided under the control of the processor 212 may be sent to the user terminal 100 via the communication module 213 and the network 300 through the communication module 113 of the user terminal 100.

The input/output interfaces 114 and 214 may be means for interfacing with an input/output device 115. In this regard, the input device may include a device such as a keyboard or mouse, and the output device may include a device such as a display for displaying 3D modeled clothing.

As another example, the input/output interfaces 114 and 214 may be means for interfacing with a device such as a touch screen in which functions for input and output are integrated into one.

In addition, in other embodiments, the user terminal 100 and the server 200 may include more components than those of FIG. 2. However, there is no need to clearly show most of components of the related art. For example, the user terminal 100 may be implemented to include at least some of the above-described input/output device 115 or may further include other components such as a transceiver, a global positioning system (GPS) module, a camera, various sensors, database, etc.

Hereinafter, an example in which a 3D modeling method of clothing is performed by the processor 112 of the user terminal 100 will be described.

The processor 112 according to an embodiment of the present disclosure may generate pattern data of clothing based on a user input.

In the present disclosure, 'pattern data' of clothing may mean a data set including various information for producing clothing. For example, the pattern data may include at least one of form, dimension information, stitch information, material information, and landmark information of at least one part constituting clothing as an attribute.

In the present disclosure, the 'part' constituting clothing may mean at least a part of clothing used for producing the corresponding clothing. For example, the part may refer to a piece of fabric cut for the production of the corresponding clothing, or may refer to a button, zipper, or other member for combining used in the production of the corresponding clothing. However, this is merely exemplary and the spirit of the present disclosure is not limited thereto.

In the present disclosure, 'stitch information' is information for combining the above-described parts, and may mean information about seams of cut pieces of fabric. In this case, the stitch information may include not only information about a material used when combining parts, but also information about a usage type when combining the corresponding material. For example, when the stitch information is information about seams of the cut pieces of fabric, the stitch information may include information about the number of sewing stitches and information about the color, thickness, and material of threads used for sewing. In addition, the stitch information may include information about physical properties of combining such as a combining method between parts, combining elasticity, and combining strength. However, this is merely exemplary and the spirit of the present disclosure is not limited thereto.

In the present disclosure, 'material information' may include visual information of a material and physical property information of the material. In this case, the visual information of the material may include a color of the material, a pattern of the material, etc. Meanwhile, the information about the physical property of the material may include thickness, density, resilience, elasticity, breathability, abrasion property, and transparency of the material. However, the above-described material information is exemplary, and may be included in the material information of the present disclosure as long as it is a property capable of representing the unique characteristics of the material.

The processor 112 according to an embodiment of the present disclosure may receive such material information from a manufacturer server (not shown) of the material, or may receive the material information from another user terminal (not shown) and store the material information in the memory 111.

The processor 112 according to an embodiment of the present disclosure may generate the aforementioned pattern data based on a user input.

In a selective embodiment, the processor 112 according to an embodiment of the present disclosure may obtain the above-described pattern data from an equipment that generates pattern data of clothing. In this case, the equipment that generates the pattern data of clothing may include, for example, a plurality of image sensors, at least one light source, and a distance sensor and generate the pattern data by scanning 3D information of clothing. However, the equipment that generates the pattern data as described above is exemplary, and the spirit of the present disclosure is not limited thereto.

Figure 3:
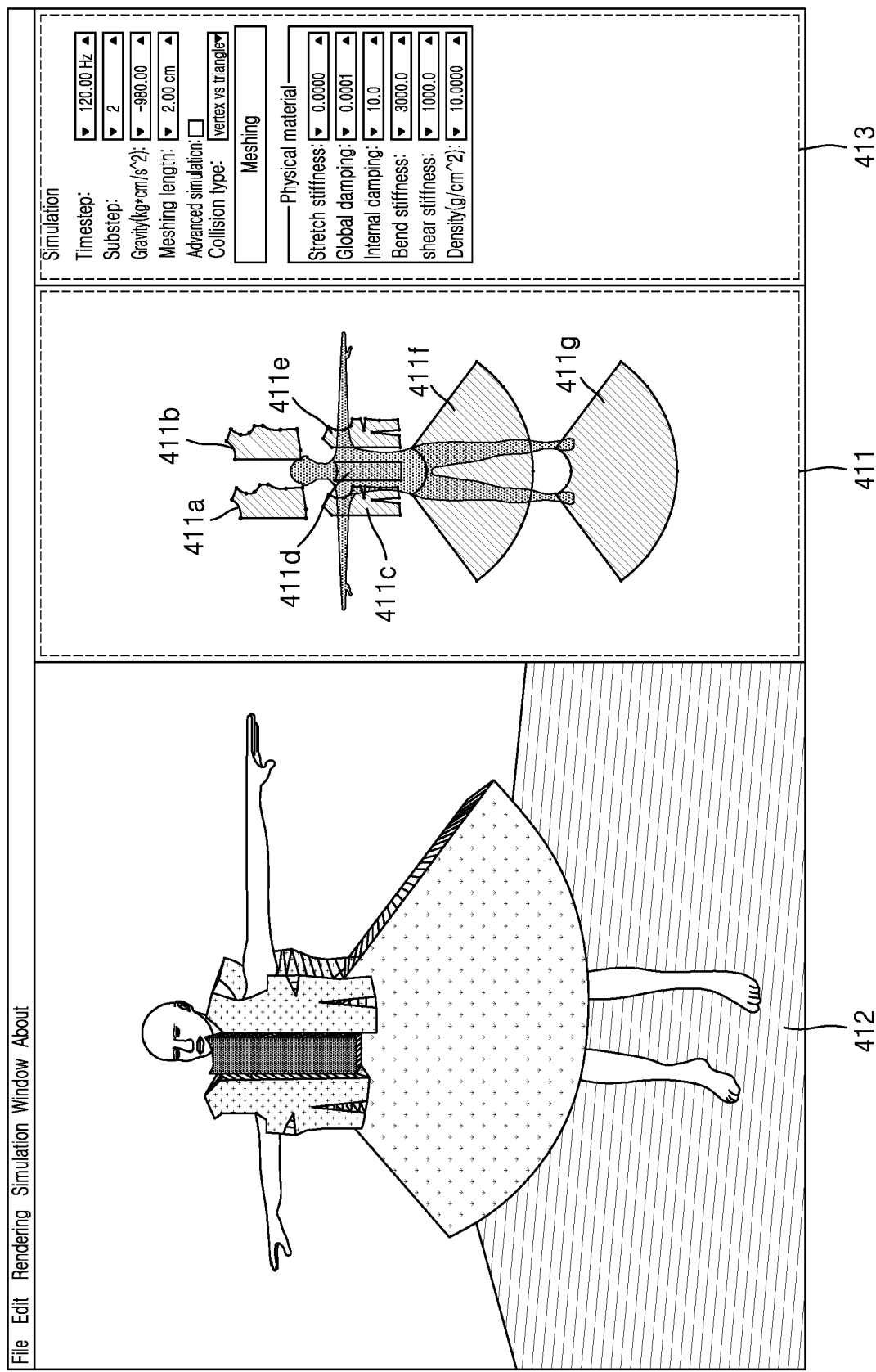
FIG. 3 is an example of a screen for generating pattern data.

FIG. 3 is an example of a screen 410 for generating pattern data.

Referring to FIG. 3, the screen 410 may include a region 411 for editing forms of parts 411a to 411g constituting clothing, a region 412 for displaying a shape of clothing in a three-dimensional (3D) space, and a region 413 for setting various setting values or setting attributes of the parts 411a to 411g or stitch information between the parts 411a to 411g when displaying clothing.

The processor 112 according to an embodiment of the present disclosure may generate the pattern data with respect to the corresponding clothing based on a user input through an interface such as the screen 410. For example, in the region 411 for editing the form of the part, a user may generate the pattern data of clothing by modifying the forms of the parts 411a to 411g or adding a new part in a two-dimensional (2D) space. Furthermore, in addition to the form of the part, the processor 112 may generate and/or edit the pattern data of clothing based on user inputs corresponding to various items constituting the pattern data of clothing.

The processor 112 may store a series of inputs and/or manipulations of the user for generating the pattern data of specific clothing in the memory 111. The processor 112 may transmit such pattern data to the server 200 and/or another user terminal (not shown) through the communication module 113.

The processor 112 according to an embodiment of the present disclosure may load the pattern data of clothing generated through the above-described process. At this time, 'loading' the pattern data may mean retrieving the pattern data from the memory 111 and/or the server 200 to make the corresponding pattern data display, editable and/or modifiable. For example, when a plurality of pattern data are generated through the above-described process, the pattern data may be loaded by a user selection of any one of a plurality of pattern data stored in the memory 111. In addition, the pattern data may be loaded by the user downloading specific pattern data from the server 200. However, this is merely exemplary and the spirit of the present disclosure is not limited thereto.

The processor 112 according to an embodiment of the present disclosure may load body data for a body on which clothing corresponding to the pattern data is to be put, similarly to loading of the pattern data. In this case, the 'body data' may include information about at least one of the size of the body, the ratio of each part, race, gender, and skin color. Also, the processor 112 according to an embodiment of the present disclosure may modify at least one of the above-described items included in the body data based on a body data modification input of the user. For example, the processor 112 may modify information about the gender included in the body data from male to female based on a user input of modifying the gender from male to female.

The processor 112 according to an embodiment of the present disclosure may display a stereoscopic shape of the corresponding clothing based on the pattern data of clothing loaded by the above-described process. In this case, the stereoscopic shape may mean a form in the 3D space of clothing based on the pattern data.

Meanwhile, the processor 112 according to an embodiment of the present disclosure may display the stereoscopic shape of clothing in consideration of the pattern data and the separately loaded body data. In other words, the processor 112 according to an embodiment of the present disclosure may display the stereoscopic shape of clothing based on the body data and the pattern data.

Figure 4:
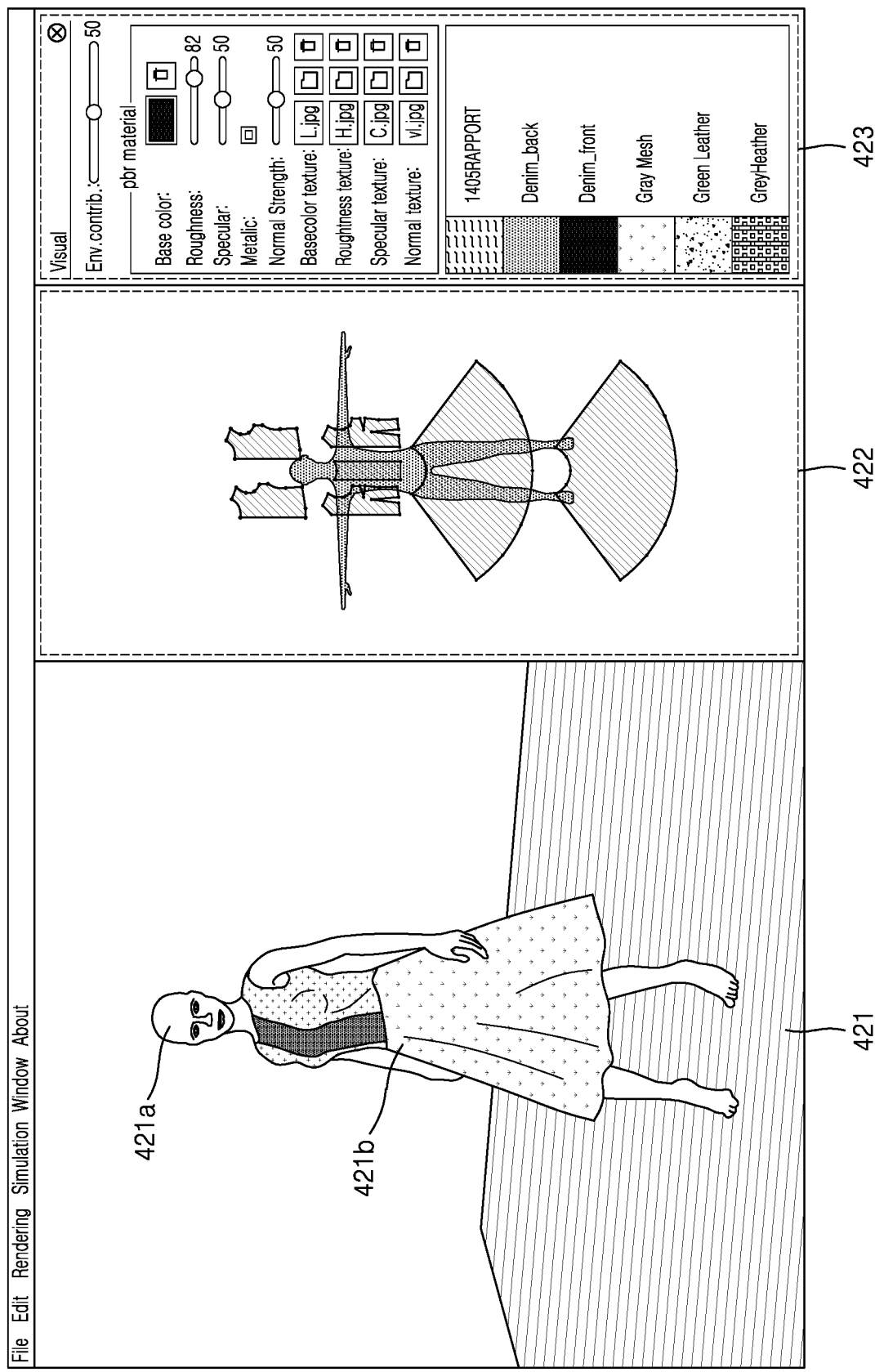
FIG. 4 is an example of a screen for displaying a stereoscopic shape of clothing.

FIG. 4 is an example of a screen 420 displaying a stereoscopic shape of clothing.

Similar to FIG. 3, the screen 420 may include a region 421 for displaying a shape in a 3D space of clothing, a region 422 for displaying or editing forms of parts constituting clothing, and a region 423 for setting various setting values when displaying clothing.

The processor 112 according to an embodiment of the present disclosure may display a 3D shape 421a of a body based on body data and a 3D shape 421b of clothing in consideration of the 3D shape 421a of the body on the region 421 for displaying the shape in the 3D space of clothing.

As described above, the processor 112 according to an embodiment of the present disclosure may consider the 3D shape 421a of the body when displaying the 3D shape 421b of clothing.

To this end, the processor 112 according to an embodiment of the present disclosure may receive a first body size which is a body size for modeling of clothing from the user.

Figure 5:
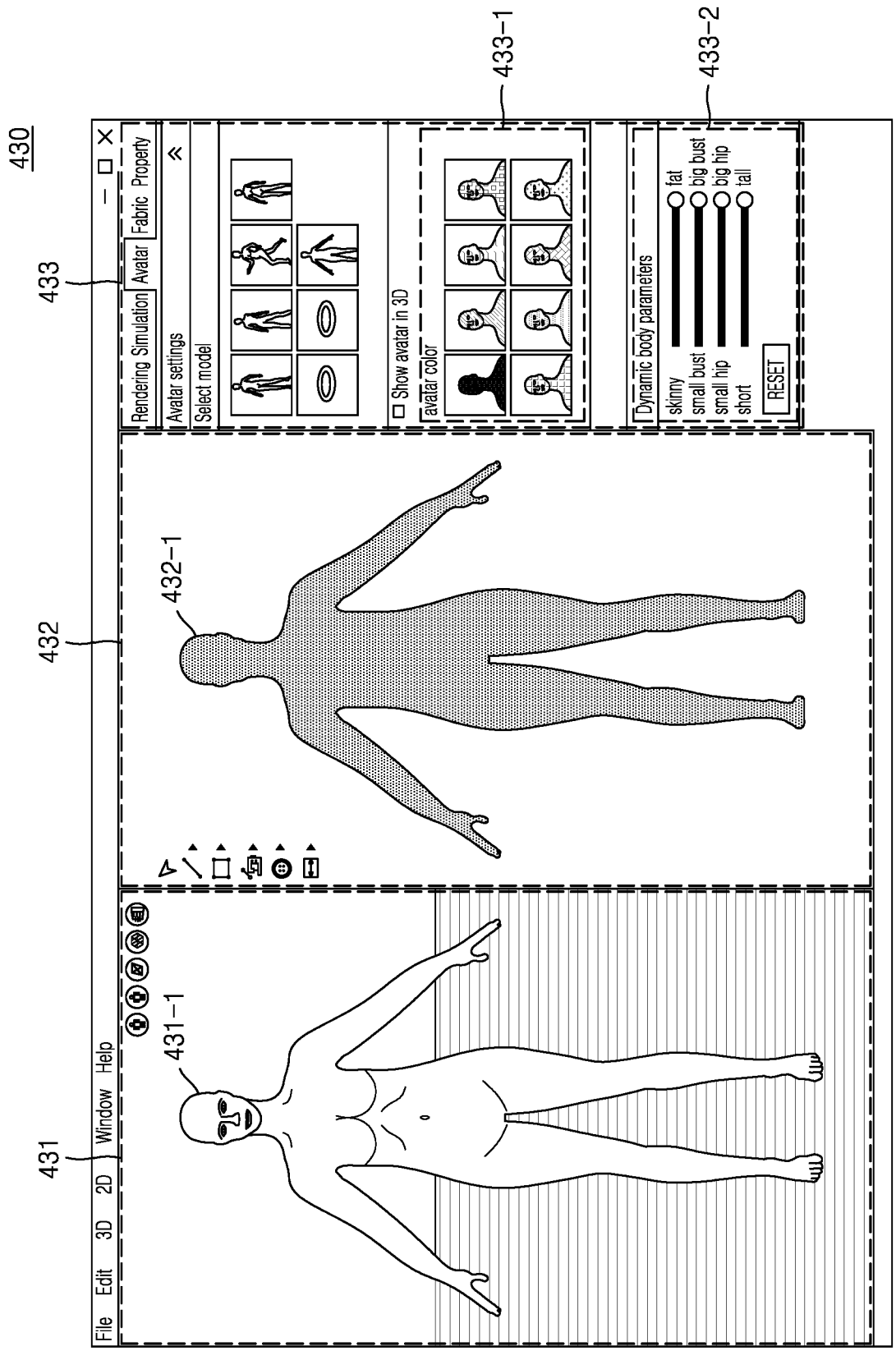
FIG. 5 is an example of a screen on which an interface for adjusting an attribute value of a body is displayed.

FIG. 5 is an example of a screen 430 on which an interface for adjusting an attribute value of a body is displayed.

At this time, the screen 430 may include a region 431 for displaying the 3D shape 431-1 of the body, a region 432 for displaying a two-dimensional (2D) shape 432-1 of the body at a specific angle, and a region 433 on which the interface for adjusting the attribute value of the body is displayed.

In an embodiment of the present disclosure, the region 433 on which the interface is displayed may include an interface 433-1 for adjusting a body color and the interface 433-2 in the form of a slider for receiving a body size.

The processor 112 according to an embodiment of the present disclosure may receive the body size input by obtaining a user input with respect to a slider on the interface 433-2. For example, when the user moves the knob on a slider with respect to a 'hip' item toward a 'big hip', the processor 112 may obtain an increased hip size according to a user input. However, the items shown in FIG. 5 are exemplary, and an item for adjusting the body size is not limited thereto.

When the value of the item for adjusting the body size changes according to the user input, the processor 112 according to the embodiment of the present disclosure may reflect this change and display a 3D shape of the body. For example, as in the above-described example, when the user moves the knob on the slider with respect to the 'hip' item toward the 'big hip', the processor 112 may display the 3D shape of the body having the increased hip according to the user input on the region 431.

The processor 112 according to an embodiment of the present disclosure may calculate a second body size whose size is reduced from a first body size received from the user according to a predetermined body reduction condition. At this time, the predetermined body reduction condition may be, for example, a condition to reduce the body size such that the volume corresponding to clothing in the absence of an external force (that is, clothing intended to display a 3D shape) is larger than the volume corresponding to a reduction body having the second body size. In other words, the predetermined body reduction condition may be a condition to reduce the body size to have the volume smaller than the basic volume of clothing determined based on at least one of the properties of one or more parts constituting clothing, material information of the one or more parts, and stitch information between the parts. However, such a body reduction condition is exemplary, and the spirit of the present disclosure is not limited thereto.

The processor 112 according to an embodiment of the present disclosure may display a 3D shape of the reduction body that is the second body size.

Figure 6:
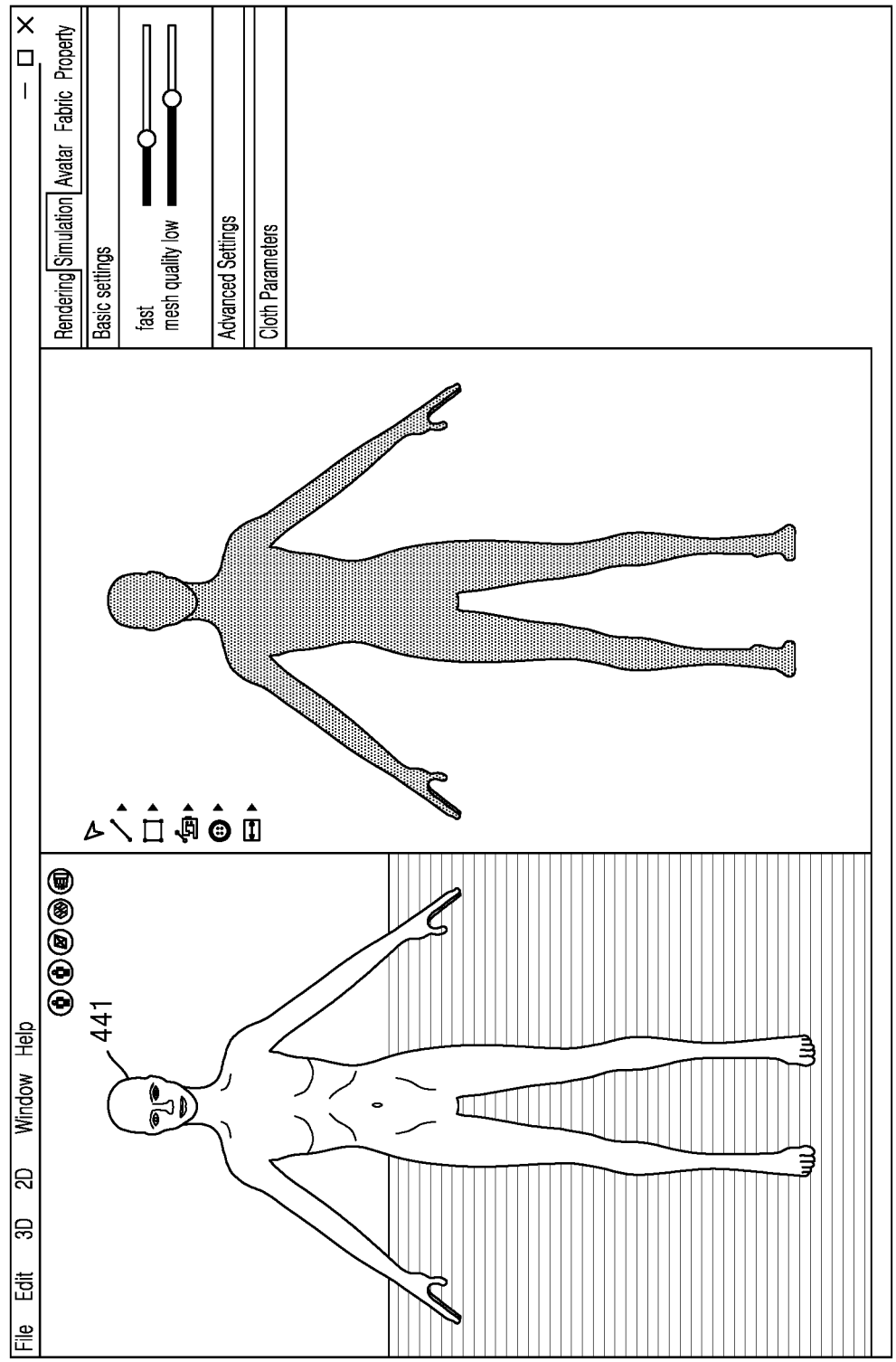
FIG. 6 is an example of a screen on which a three-dimensional (3D) shape of a reduction body is displayed on a region for displaying a 3D shape of a body.

FIG. 6 is an example of a screen 440 on which a 3D shape 441-1 of a reduction body is displayed on a region for displaying a 3D shape of a body. Compared to the 3D shape 431-1 of the body shown in FIG. 5, it may be seen that each part of the body of the 3D shape 441 of the reduction body is reduced.

The processor 112 according to an embodiment of the present disclosure may overlap and display a 3D shape of clothing to be modeled on the 3D shape 441 of the reduction body.

Figure 7:
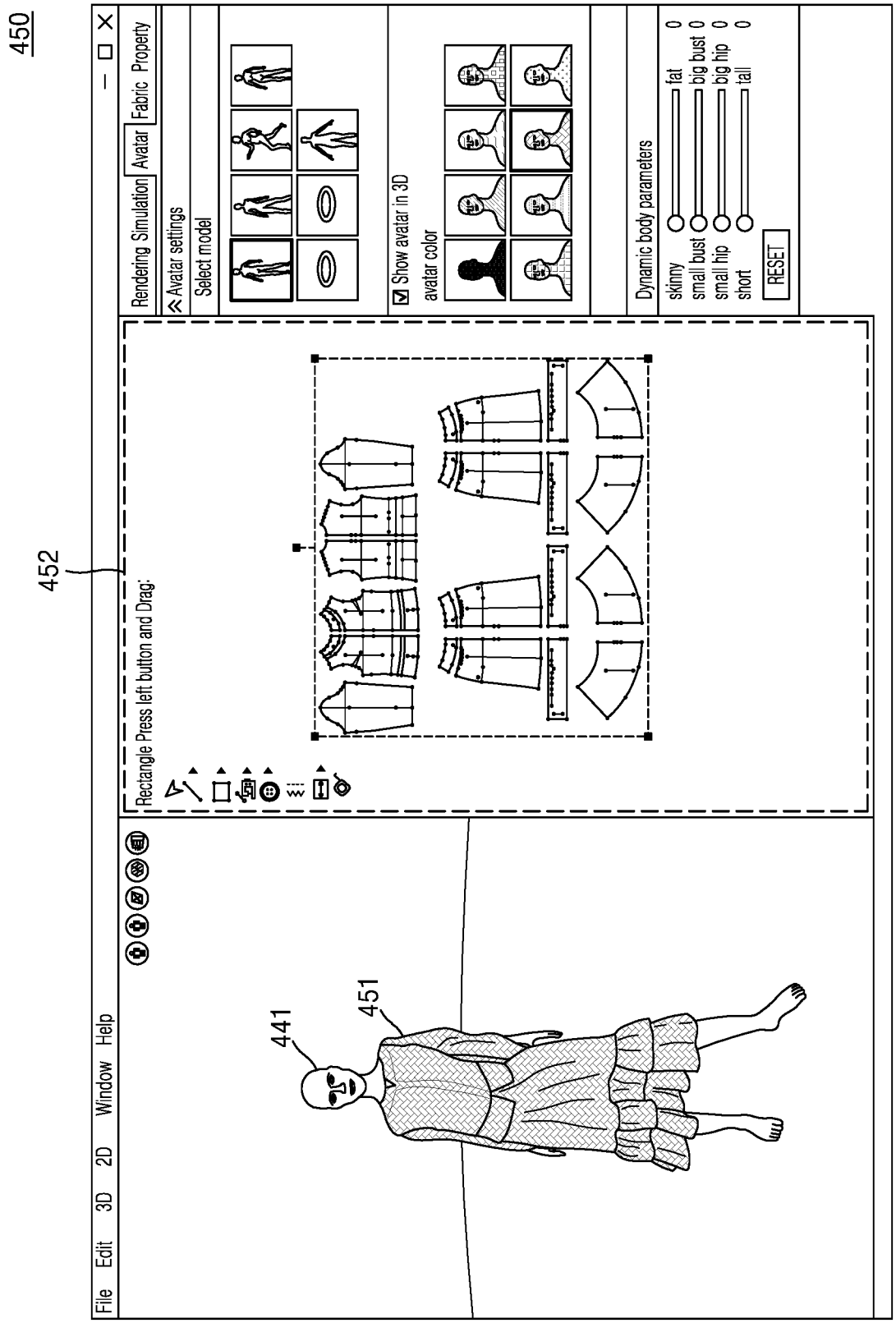
FIG. 7 is an example of a screen on which a 3D shape of clothing is overlapped and displayed on the 3D shape of a reduction body.

FIG. 7 is an example of a screen 450 on which a 3D shape 451 of clothing is overlapped and displayed on the 3D shape 441 of a reduction body.

In the present disclosure, 'overlapping and displaying a 3D shape of clothing on a 3D shape of a body' may mean that the 3D shape of clothing is determined in consideration of the direction of gravity such that an outer surface of the 3D shape of the body and an inner surface of the 3D shape of clothing have a predetermined relationship.

In this case, the 'predetermined relationship' may mean a relationship in which a distance between a first point which is an arbitrary point on the outer surface of the body and a second point which is an arbitrary point on the inner surface of clothing is equal to or greater than a predetermined minimum distance. Accordingly, the 3D shape of clothing may be generated in consideration of the 3D shape of the body and gravity.

For example, the processor 112 according to an embodiment of the present disclosure may determine the 3D shape 451 of clothing such that an outer surface of the 3D shape 441 of the reduction body and an inner surface of the 3D shape 451 of clothing have a predetermined relationship.

In a selective embodiment, the processor 112 according to an embodiment of the present disclosure may obtain a user input to edit forms of parts constituting clothing while the 3D shape 451 of clothing is overlapped and displayed on the 3D shape 441 of the reduction body. For example, the processor 112 may obtain an edit input of a user with respect to a part displayed on a region 452 displaying the parts constituting clothing and display a 3D shape of clothing corrected according to the edit input on the 3D shape 441 of the reduction body.

The processor 112 according to an embodiment of the present disclosure may display a change process of the 3D shape 451 of clothing overlapped on the reduction body while gradually increasing a body size of the reduction body to a first body size input by the user.

Figure 8:
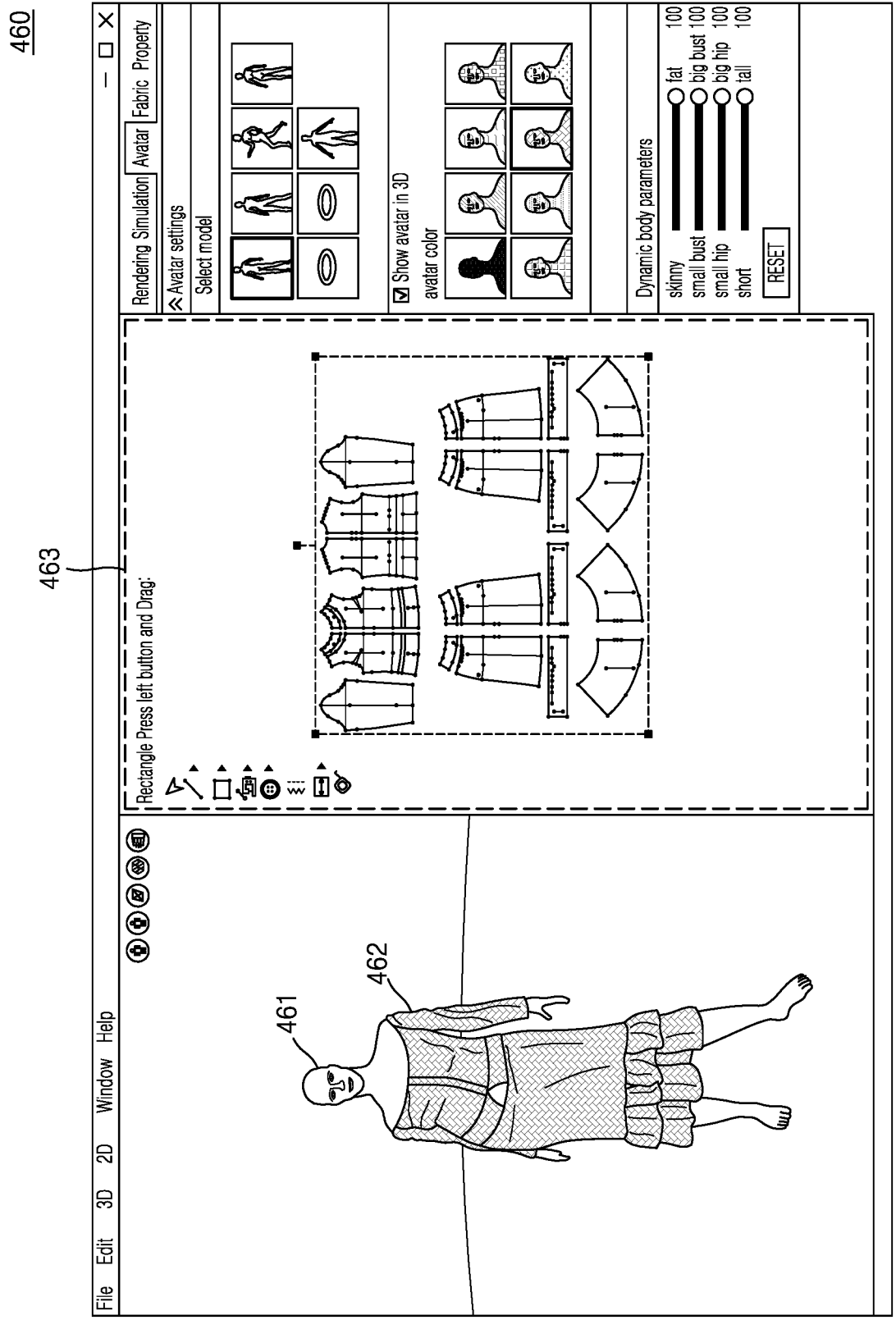
FIG. 8 is an example of a screen on which a 3D shape of clothing is displayed on a 3D shape of a body having a first body size.

FIG. 8 is an example of a screen 460 on which a 3D shape 462 of clothing is displayed on a 3D shape 461 of a body having a first body size.

The processor 112 according to an embodiment of the present disclosure may determine a changed 3D shape of clothing under the condition that an outer surface of the 3D shape 461 of the body with an increased size and the inner surface of the 3D shape 462 of clothing continuously maintains the relationship described above when displaying a change process of the 3D shape 462 of clothing. In other words, the processor 112 may determine the 3D shape 462 of clothing such that the 3D shape 462 of clothing reflects the 3D shape 461 of the increased body as the body size increases.

In addition, the processor 112 may continuously display a process of changing the 3D shape 451 of clothing overlapped on the 3D shape 441 of the reduction body to the 3D shape 462 of clothing overlapped on the 3D shape 461 of the body having the first body size.

In other words, the processor 112 may display a 3D shape of clothing overlapped on a 3D shape of the body having a body size at a first time (an arbitrary time before the body size becomes the first body size) and then display a 3D shape of clothing overlapped on a 3D shape of the body having a body size at a second time (a time after the first time that is the arbitrary time before the body size becomes the first body size).

Accordingly, the present disclosure may more naturally model a situation when clothing is put on the human body. In particular, the present disclosure may enable modeling of clothing made of an elastic material and may provide a more natural modeling result of clothing made of the elastic material.

In addition, the present disclosure may enable effective modeling of clothing when the volume corresponding to clothing in the absence of an external force is smaller than the volume of the body having a body size input by the user.

In a selective embodiment, the processor 112 according to an embodiment of the present disclosure may obtain a user input to edit forms of parts constituting clothing while the 3D shape 462 of clothing is overlapped and displayed on the 3D shape 461 of the body having the first body size. For example, the processor 112 may obtain an edit input of the user with respect to a part displayed on a region 463 displaying the parts constituting clothing and display a 3D shape of clothing corrected according to the edit input on the 3D shape 461 of the body having the first body size.

As described above, the present disclosure may enable to easily modify clothing in each step of modeling of clothing.

According to a selection of the user, the processor 112 according to an embodiment of the present disclosure may display a stress map indicating a stress degree of a 3D shape of clothing with an increased size. In this case, the 'stress map' may refer to an image showing a degree to which each portion of clothing is pulled.

Figure 9:
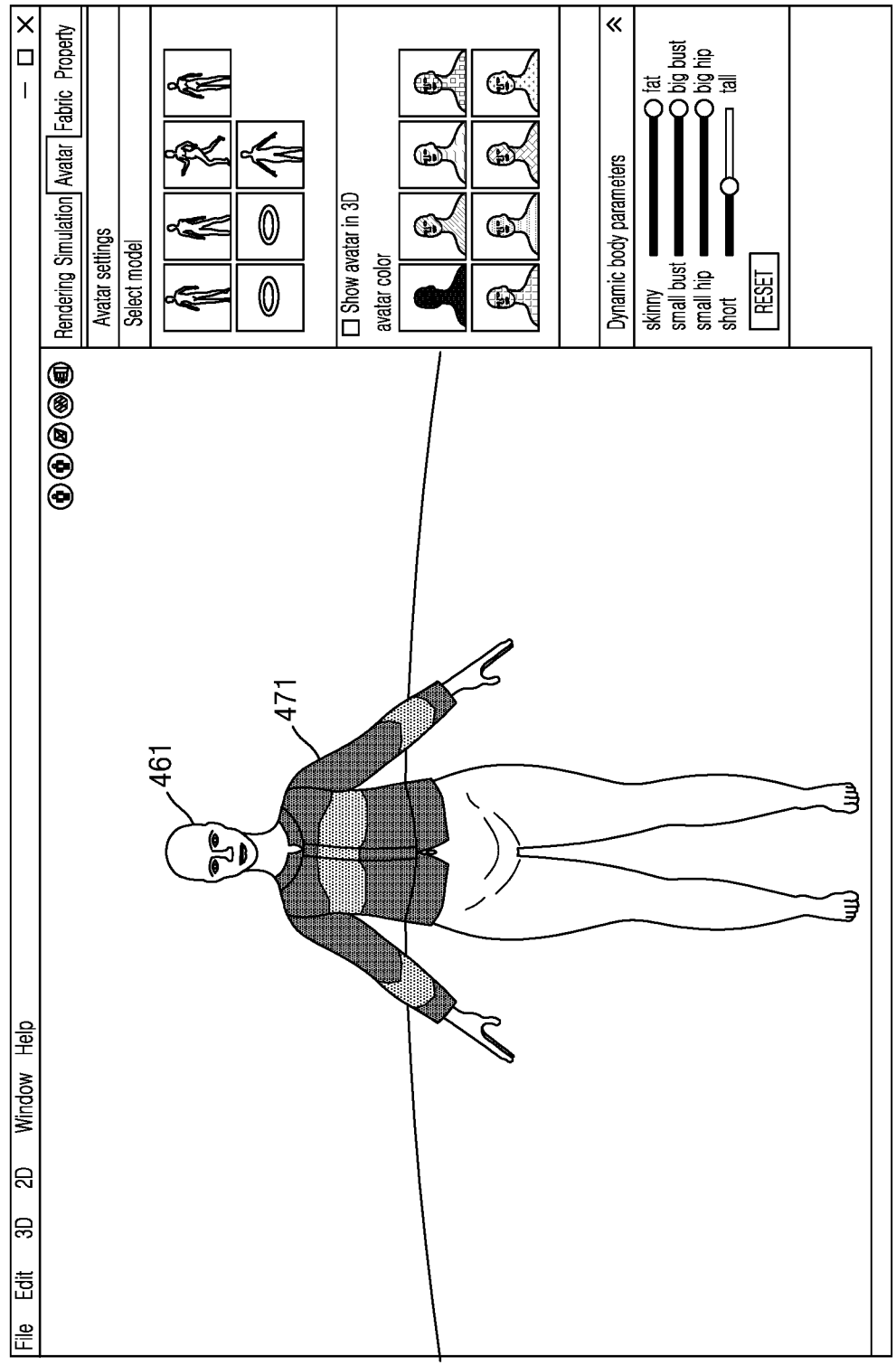
FIG. 9 is an example of a screen on which a stress map is displayed on the 3D shape of the body having the first body size.

FIG. 9 is an example of a screen on which a stress map 471 is displayed on the 3D shape 461 of a body having a first body size. The processor 112 may display the stress map 471 on the 3D shape 461 of the body as shown in FIG. 9 according to a stress map request input of a user and quantitatively determine whether clothing that is a modeling target is abnormal in a first body size. For example, in the stress map 471 in FIG. 9, a portion marked with a light color may correspond to a portion with high stress, and a portion marked with a dark color may correspond to a portion with low stress.

When the body is defined by one or more parts constituting a human body model and one or more joints connecting the one or more parts, the processor 112 according to an embodiment of the present disclosure may display a changed stress of clothing overlapped on the 3D shape 461 of the body that changes according to driving of any one joint of the one or more joints constituting the body. For example, the processor 112 may display the 3D shape 461 of the body taking a pose in response to a selection input of the user with respect to any one pose provided on a pose selection region (represented by a select model) and accordingly display the stress map 471 indicating the changed stress of clothing.

Meanwhile, the processor 112 according to an embodiment of the present disclosure may increase and display the size of the 3D shape 461 of clothing overlapped on the body according to the increase in a body size and identify a defect on the 3D shape 461 of the increased clothing. For example, the processor 112 may identify the defect on the 3D shape 461 of the increased clothing considering properties of the one or more parts constituting clothing, material information of the one or more parts, and stitch information between the one or more parts constituting clothing. In addition, the processor 112 may display defect information when the defect is identified.

Figure 10:
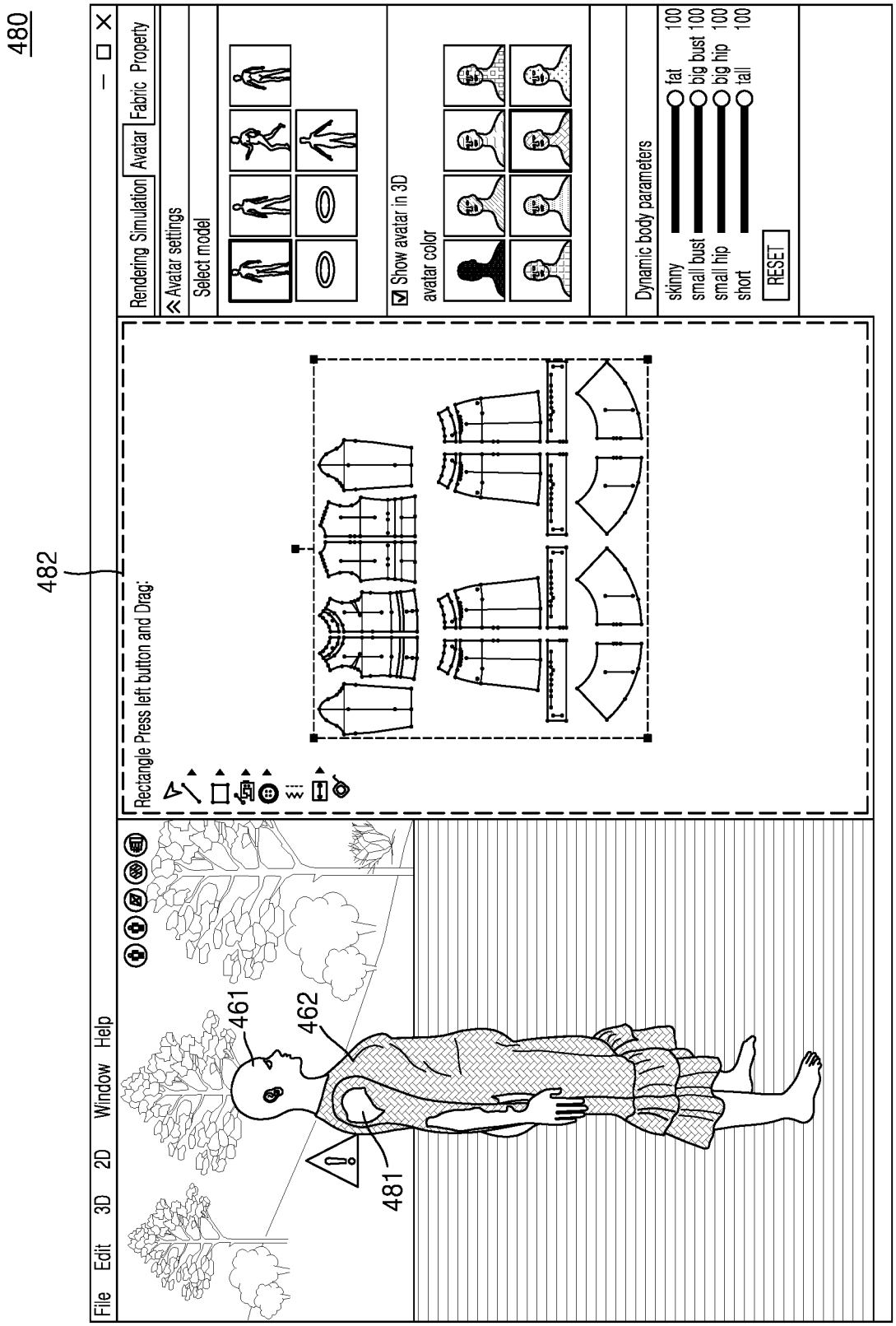
FIG. 10 is an example of a screen on which defect information is displayed.

FIG. 10 is an example of a screen 480 on which defect information is displayed. For convenience of description, the description will be given on the assumption that a defect in which parts are not connected to shoulder and sleeve portions of a 3D shape of clothing has occurred due to an excessive increase in a body size.

As shown in FIG. 10, the processor 112 according to an embodiment of the present disclosure may display a defect indication mark on a position corresponding to a portion 481 where the defect occurs on the 3D shape 462 of clothing.

In addition, the processor 112 may additionally display a third body size when the defect occurs in the third body size (greater than a first body size and smaller than a second body size) in a process of increasing and displaying the body size from the second body size to the first body size.

In a selective embodiment, the processor 112 according to an embodiment of the present disclosure may obtain a user input to edit forms of parts constituting clothing and display whether to resolve the defect on the 3D shape 462 of clothing while the 3D shape 462 of clothing in which the defect has occurred is displayed. For example, the processor 112 may obtain an edit input of the user to increase the size of the shoulder portion on a part displayed on a region 482 displaying the parts constituting clothing and display a 3D shape of clothing in which the defect has been corrected according to the edit input on the 3D shape 461 of the body. As described above, the present disclosure may enable to easily modify clothing in each step of modeling of clothing.

Figure 11:
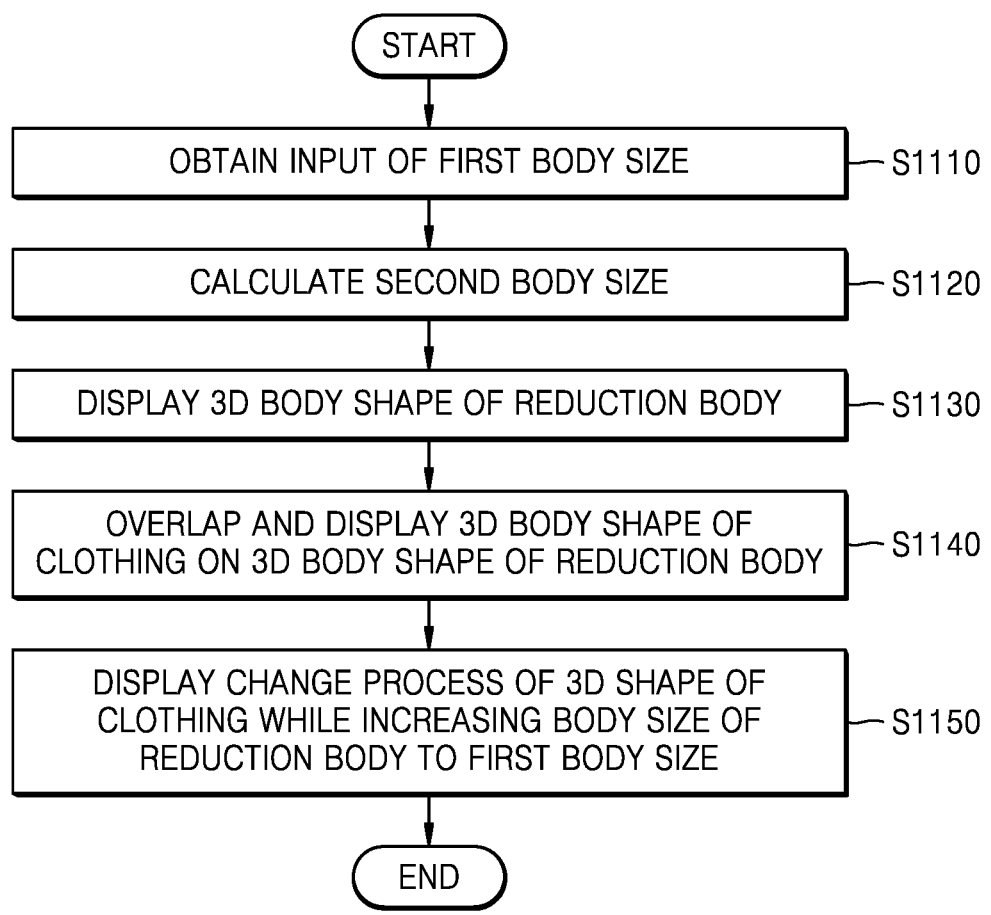
FIG. 11 is a flowchart illustrating a 3D modeling method of clothing performed by a user terminal according to an embodiment of the present disclosure.

FIG. 11 is a flowchart illustrating a 3D modeling method of clothing performed by the user terminal 100 according to an embodiment of the present disclosure. Hereinafter, descriptions of FIG. 11 redundant with those in FIGS. 1 to 10 will be omitted, and FIG. 11 will be described with reference to FIGS. 1 to 10 together.

The user terminal 100 according to an embodiment of the present disclosure may receive a first body size which is a body size for modeling of clothing from the user. (S1110)

FIG. 5 is an example of the screen 430 on which an interface for adjusting an attribute value of a body is displayed.

At this time, the screen 430 may include the region 431 for displaying the 3D shape 431-1 of the body, the region 432 for displaying the two-dimensional (2D) shape 432-1 of the body at a specific angle, and the region 433 on which the interface for adjusting the attribute value of the body is displayed.

In an embodiment of the present disclosure, the region 433 on which the interface is displayed may include the interface 433-1 for adjusting a body color and the interface 433-2 in the form of a slider for receiving a body size.

The user terminal 100 according to an embodiment of the present disclosure may receive the body size input by obtaining a user input with respect to a slider on the interface 433-2. For example, when the user moves the knob on a slider with respect to a 'hip' item toward a 'big hip', the user terminal 100 may obtain an increased hip size according to a user input. However, the items shown in FIG. 5 are exemplary, and an item for adjusting the body size is not limited thereto.

When the value of the item for adjusting the body size changes according to the user input, the user terminal 100 according to the embodiment of the present disclosure may reflect this change and display a 3D shape of the body. For example, as in the above-described example, when the user moves the knob on the slider with respect to the 'hip' item toward the 'big hip', the user terminal 100 may display the 3D shape of the body having the increased hip according to the user input on the region 431.

The user terminal 100 according to an embodiment of the present disclosure may calculate a second body size whose size is reduced from a first body size received from the user according to a predetermined body reduction condition. (S1120) At this time, the predetermined body reduction condition may be, for example, a condition to reduce the body size such that the volume corresponding to clothing in the absence of an external force (that is, clothing intended to display a 3D shape) is larger than the volume corresponding to a reduction body having the second body size. In other words, the predetermined body reduction condition may be a condition to reduce the body size to have the volume smaller than the basic volume of clothing determined based on at least one of the properties of one or more parts constituting clothing, material information of the one or more parts, and stitch information between the parts. However, such a body reduction condition is exemplary, and the spirit of the present disclosure is not limited thereto.

The user terminal 100 according to an embodiment of the present disclosure may display a 3D shape of the reduction body that is the second body size. (S1130)

FIG. 6 is an example of the screen 440 on which the 3D shape 441-1 of a reduction body is displayed on a region for displaying a 3D shape of a body. Compared to the 3D shape 431-1 of the body shown in FIG. 5, it may be seen that each part of the body of the 3D shape 441 of the reduction body is reduced.

The user terminal 100 according to an embodiment of the present disclosure may overlap and display a 3D shape of clothing to be modeled on the 3D shape 441 of the reduction body. (S1140)

FIG. 7 is an example of the screen 450 on which the 3D shape 451 of clothing is overlapped and displayed on the 3D shape 441 of a reduction body.

In the present disclosure, 'overlapping and displaying a 3D shape of clothing on a 3D shape of a body' may mean that the 3D shape of clothing is determined in consideration of the direction of gravity such that an outer surface of the 3D shape of the body and an inner surface of the 3D shape of clothing have a predetermined relationship.

In this case, the 'predetermined relationship' may mean a relationship in which a distance between a first point which is an arbitrary point on the outer surface of the body and a second point which is an arbitrary point on the inner surface of clothing is equal to or greater than a predetermined minimum distance. Accordingly, the 3D shape of clothing may be generated in consideration of the 3D shape of the body and gravity.

For example, the user terminal 100 according to an embodiment of the present disclosure may determine the 3D shape 451 of clothing such that an outer surface of the 3D shape 441 of the reduction body and an inner surface of the 3D shape 451 of clothing have a predetermined relationship.

In a selective embodiment, the user terminal 100 according to an embodiment of the present disclosure may obtain a user input to edit forms of parts constituting clothing while the 3D shape 451 of clothing is overlapped and displayed on the 3D shape 441 of the reduction body. For example, the user terminal 100 may obtain an edit input of a user with respect to a part displayed on a region 452 displaying the parts constituting clothing and display a 3D shape of clothing corrected according to the edit input on the 3D shape 441 of the reduction body.

The user terminal 100 according to an embodiment of the present disclosure may display a change process of the 3D shape 451 of clothing overlapped on the reduction body while gradually increasing a body size of the reduction body to a first body size input by the user. (S1150)

FIG. 8 is an example of the screen 460 on which the 3D shape 462 of clothing is displayed on the 3D shape 461 of a body having a first body size.

The user terminal 100 according to an embodiment of the present disclosure may determine a changed 3D shape of clothing under the condition that an outer surface of the 3D shape 461 of the body with an increased size and the inner surface of the 3D shape 462 of clothing continuously maintains the relationship described above when displaying a change process of the 3D shape 462 of clothing. In other words, the user terminal 100 may determine the 3D shape 462 of clothing such that the 3D shape 462 of clothing reflects the 3D shape 461 of the increased body as the body size increases.

In addition, the user terminal 100 may continuously display a process of changing the 3D shape 451 of clothing overlapped on the 3D shape 441 of the reduction body to the 3D shape 462 of clothing overlapped on the 3D shape 461 of the body having the first body size.

In other words, the user terminal 100 may display a 3D shape of clothing overlapped on a 3D shape of the body having a body size at a first time (an arbitrary time before the body size becomes the first body size) and then display a 3D shape of clothing overlapped on a 3D shape of the body having a body size at a second time (a time after the first time that is the arbitrary time before the body size becomes the first body size).

Accordingly, the present disclosure may more naturally model a situation when clothing is put on the human body. In particular, the present disclosure may enable modeling of clothing made of an elastic material and may provide a more natural modeling result of clothing made of the elastic material.

In addition, the present disclosure may enable effective modeling of clothing when the volume corresponding to clothing in the absence of an external force is smaller than the volume of the body having a body size input by the user.

In a selective embodiment, the user terminal 100 according to an embodiment of the present disclosure may obtain a user input to edit forms of parts constituting clothing while the 3D shape 462 of clothing is overlapped and displayed on the 3D shape 461 of the body having the first body size. For example, the user terminal 100 may obtain an edit input of the user with respect to a part displayed on a region 463 displaying the parts constituting clothing and display a 3D shape of clothing corrected according to the edit input on the 3D shape 461 of the body having the first body size.

As described above, the present disclosure may enable to easily modify clothing in each step of modeling of clothing.

According to a selection of the user, the user terminal 100 according to an embodiment of the present disclosure may display a stress map indicating a stress degree of a 3D shape of clothing with an increased size. In this case, the 'stress map' may refer to an image showing a degree to which each portion of clothing is pulled.

FIG. 9 is an example of a screen on which the stress map 471 is displayed on the 3D shape 461 of a body having a first body size. The user terminal 100 may display the stress map 471 on the 3D shape 461 of the body as shown in FIG. 9 according to a stress map request input of a user and quantitatively determine whether clothing that is a modeling target is abnormal in a first body size. For example, in the stress map 471 in FIG. 9, a portion marked with a light color may correspond to a portion with high stress, and a portion marked with a dark color may correspond to a portion with low stress.

When the body is defined by one or more parts constituting a human body model and one or more joints connecting the one or more parts, the user terminal 100 according to an embodiment of the present disclosure may display a changed stress of clothing overlapped on the 3D shape 461 of the body that changes according to driving of any one of the one or more joints constituting the body. For example, the user terminal 100 may display the 3D shape 461 of the body taking a pose in response to a selection input of the user with respect to any one pose provided on a pose selection region (represented by a select model) and accordingly display the stress map 471 indicating the changed stress of clothing.

Meanwhile, the user terminal 100 according to an embodiment of the present disclosure may increase and display the size of the 3D shape 461 of clothing overlapped on the body according to the increase in a body size and identify a defect on the 3D shape 461 of the increased clothing. For example, the user terminal 100 may identify the defect on the 3D shape 461 of the increased clothing considering properties of the one or more parts constituting clothing, material information of the one or more parts, and stitch information between the one or more parts constituting clothing. In addition, the user terminal 100 may display defect information when the defect is identified.

FIG. 10 is an example of the screen 480 on which defect information is displayed. For convenience of description, the description will be given on the assumption that a defect in which parts are not connected to shoulder and sleeve portions of a 3D shape of clothing has occurred due to an excessive increase in a body size.

As shown in FIG. 10, the user terminal 100 according to an embodiment of the present disclosure may display a defect indication mark on a position corresponding to the portion 481 where the defect occurs on the 3D shape 462 of clothing.

In addition, the user terminal 100 may additionally display a third body size when the defect occurs in the third body size (greater than a first body size and smaller than a second body size) in a process of increasing and displaying the body size from the second body size to the first body size.

In a selective embodiment, the user terminal 100 according to an embodiment of the present disclosure may obtain a user input to edit forms of parts constituting clothing and display whether to resolve the defect on the 3D shape 462 of clothing while the 3D shape 462 of clothing in which the defect has occurred is displayed. For example, the user terminal 100 may obtain an edit input of the user to increase the size of the shoulder portion on a part displayed on the region 482 displaying the parts constituting clothing and display a 3D shape of clothing in which the defect has been corrected according to the edit input on the 3D shape 461 of the body. As described above, the present disclosure may enable to easily modify clothing in each step of modeling of clothing.

The device described above may be realized as hardware elements, software elements, and/or the combination of hardware elements and software elements. For example, the device and the components described in the embodiments may be realized by using, for example, a processor, an arithmetic logic unit (ALU), a digital signal processor, a microcomputer, a field programmable gate array (FPGA), a programmable logic unit (PLU), a microprocessor, or one or more general-purpose computers or special-purpose computers, such as a device capable of executing and responding to instructions. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described embodiments may be recorded in non-transitory computer-readable media including program instructions to implement various operations embodied by a computer. The non-transitory computer-readable media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

As described above, although the embodiments have been described by the limited embodiment and drawings, it will be apparent to one of ordinary skill in the art that various changes in form and details may be made in these examples without departing from the spirit and scope of the claims and their equivalents. For example, suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A three-dimensional (3D) modeling method of clothing to adjust a size of a body on which the clothing is put on and to model an appearance when the clothing is put on the body, the 3D modeling method comprising:
   receiving a first body size for modeling of the clothing;
   calculating a second body size which is reduced from the first body size according to a predetermined body reduction condition;
   displaying a 3D shape of a reduction body having the second body size;
   overlapping and displaying a 3D shape of the clothing on the 3D shape of the reduction body, wherein the 3D shape of the clothing is defined by properties of one or more parts constituting the clothing, material information of the one or more parts, and stitch information between the one or more parts, wherein the properties of the one or more parts comprise shapes of the one or more parts, wherein the material information of the one or more parts comprises elasticity of the one or more parts, and wherein the stitch information between the one or more parts comprises at least one of a combining method, combining elasticity, and combining strength between the one or more parts; and
   displaying a change process of the 3D shape of the clothing overlapped on the 3D shape of the reduction body while increasing the second body size of the 3D shape of the reduction body to the first body size input by an user, wherein the displaying of the change process of the 3D shape of the clothing comprises:

displaying an increased size of the 3D shape of the clothing overlapped on the 3D shape of the reduction body according to an increase in the second body size; and identifying a defect on the increased size of the 3D shape of the clothing by considering the properties of the one or more parts constituting the clothing, the material information of the one or more parts, and the stitch information between the one or more parts.

2. The 3D modeling method of claim 1, wherein the overlapping and the displaying of the 3D shape of the clothing comprises: determining the 3D shape of the clothing such that an outer surface of the 3D shape of the reduction body and an inner surface of the 3D shape of the clothing have a predetermined relationship.

3. The 3D modeling method of claim 2, wherein the displaying of the change process of the 3D shape of the clothing further comprises: determining a changed 3D shape of the clothing such that an outer surface of the increased size of the 3D shape of the reduction body and the inner surface of the 3D shape of the clothing maintain the predetermined relationship.

4. The 3D modeling method of claim 1, wherein the predetermined body reduction condition is a particular condition to reduce the first body size such that a volume corresponding to the clothing in the absence of an external force is larger than a volume corresponding to the reduction body.

* * * * *